United States Patent [19]

Turak et al.

[11] Patent Number: 4,817,765
[45] Date of Patent: Apr. 4, 1989

[54] BACKING PLATE ASSEMBLY FOR A DRUM BRAKE

[75] Inventors: John L. Turak, South Bend; Robert Spaargaren, Granger, both of Ind.

[73] Assignee: Allied Corporation, Morristown, N.J.

[21] Appl. No.: 99,632

[22] Filed: Sep. 22, 1987

Related U.S. Application Data

[63] Continuation of Ser. No. 875,112, Jun. 17, 1986, abandoned, which is a continuation-in-part of Ser. No. 726,932, Apr. 26, 1985, abandoned, which is a continuation-in-part of Ser. No. 490,762, May 2, 1983, abandoned.

[51] Int. Cl.$^4$ .............................................. F16D 65/00
[52] U.S. Cl. ........................... 188/218 A; 277/237 A; 301/6 WB
[58] Field of Search .................. 188/218 A; 192/30 V, 192/112; 301/6 R, 6 WB; 277/237 A, DIG. 4

[56] References Cited

U.S. PATENT DOCUMENTS

| | | | |
|---|---|---|---|
| 1,727,787 | 9/1929 | Rothrock | 301/6 WB |
| 1,923,086 | 8/1933 | Givens | 188/218 A |
| 2,012,838 | 8/1935 | Tilden | 188/218 X |
| 2,988,173 | 6/1961 | Romine | 188/218 X |
| 3,003,819 | 10/1961 | Hibbard | 301/6 R |
| 3,213,976 | 10/1965 | Yost et al. | 192/112 X |
| 3,294,201 | 12/1966 | Swift | 188/340 X |
| 4,102,442 | 7/1978 | Colpaert | 188/206 A |
| 4,243,234 | 1/1981 | Blaha | 188/18 R |
| 4,332,310 | 6/1982 | Iwai et al. | 188/218 A |

FOREIGN PATENT DOCUMENTS

| | | | |
|---|---|---|---|
| 0124419 | 7/1984 | European Pat. Off. | 188/218 A |
| 740628 | 10/1943 | Fed. Rep. of Germany | 188/218 A |
| 50993 | 2/1941 | France | 188/218 A |
| 1472394 | 1/1967 | France | 301/6 R |
| 64566 | 5/1977 | Japan | 188/218 A |
| 332981 | 8/1930 | United Kingdom | 188/218 A |

Primary Examiner—George E. A. Halvosa
Attorney, Agent, or Firm—Larry J. Palguta; Ken C. Decker

[57] ABSTRACT

A backing plate assembly for a drum brake includes a first part adapted for attachment to a vehicle frame and a second part releasably coupled to the first part. The second part is made of a material that effects substantial noise reduction in the assembly and the second part is tightly frictionally coupled to the first part. The second part sees no braking torque and is coupled to a reinforced portion of the first part.

10 Claims, 4 Drawing Sheets

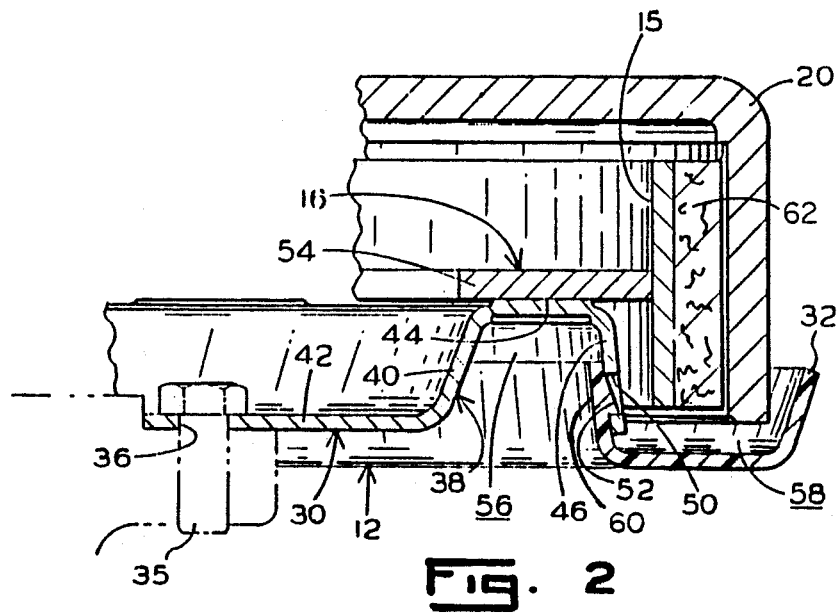
Fig. 2
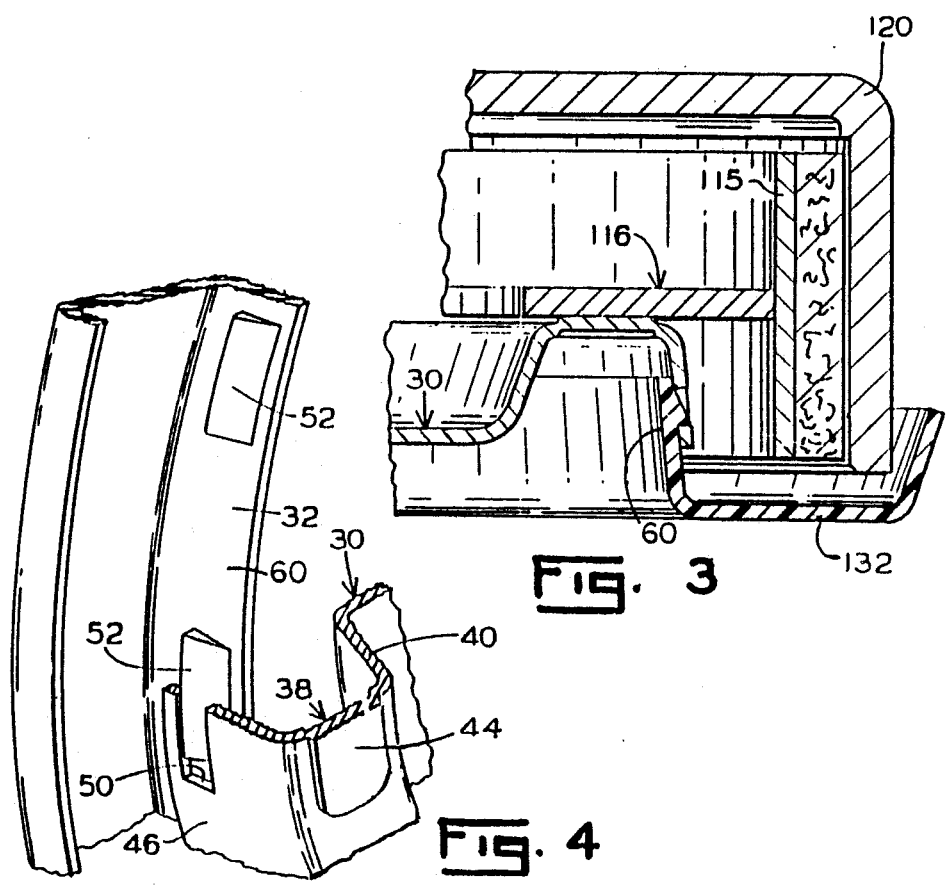
Fig. 3
Fig. 4

BACKING PLATE ASSEMBLY FOR A DRUM BRAKE

This is a continuation of abandoned application Ser. No. 875,112 filed June 17, 1986 which is a continuation-in-part of abandoned application Ser. No. 726,932 filed Apr. 26, 1985 which is a continuation-in-part of abandoned application Ser. No. 490,762 filed May 2, 1983.

This invention relates to a backing plate assembly for a drum brake wherein the backing plate supports a pair of brake shoes and a wheel cylinder which receives fluid pressure to move the pair of brake shoes into engagement with a drum to be braked.

There is a limited supply of crude oil from which fuel is obtained for motor vehicle consumption. As the supply is reduced the price for fuel is expected to increase so that a motor vehicle must consume as little fuel as possible in order to provide economical transportation and preserve the limited supply of crude oil. In response to this demand for efficiency, motor vehicles are being reduced in size and weight so that smaller engines can be used with smaller fuel consumption requirements. Brake assemblies for the motor vehicle are also being reduced in size and weight to support the reduced size and weight goals for the motor vehicle. In addition, the manufacture of a brake requires various machinery for each size of brake so that each size of brake requires a separate machine or die to generate the backing plate associated for each size of brake.

Another common problem in a conventional drum brake is noise. Specifically, it is common for a drum brake to produce various squeals, chatters and other sounds as a result of the varying friction forces and the natural resonant frequencies of the mechanism.

It has been proposed to manufacture a drum brake backing plate from two parts. One of the parts is designed to accommodate the braking torque requirements while the second part is designed to enclose the brake to isolate the latter from the contaminates, such as, dirt, stones, dust, snow, salt, etc. found on a roadway for the motor vehicle. To date the proposed two part construction for the backing plate has not been widely accepted by vehicle manufacturers.

The prior art is illustrated by U.S. Pat. Nos. 3,548,976; 3,576,237; 3,998,297 and 4,102,442. In U.S. Pat. Nos. 3,548,976 and 3,576,237, the radially outer part which is made of lighter material than the radial inner part, the outer part is burdened with support responsibility for the pair of brake shoes so that sufficient strength is required of the outer part. Consequently, the outer part is not designed solely for weight savings. In addition, the outer part requires separate adhesives or welding material for attachment with the inner part, thereby adding to the manufacturing cost of this type of two-part backing plate. In U.S. Pat. No. 3,998,297 the outer part is redundant as the inner part extends outwardly to the drum so that the outer part is not required. And in U.S. Pat. No. 4,102,442, the lightweight outer part overlaps with the inner part so that excess material for the lightweight outer part is required.

The present invention provides a backing plate assembly for a drum brake with a pair of brake shoes wherein the backing plate assembly comprises a first part adapted for attachment to a vehicle frame and a second part cooperating with the drum to substantially protect the drum brake from contaminants characterized in that said first part defines a reinforced portion substantially at the radial extremity thereof to transmit braking forces developed during braking, said reinforced portion further being engageable with said pair of brake shoes to direct movement of the latter during braking, said second part being tensionably coupled to said reinforced portion to substantially enclose the drum brake between the backing plate and the drum, and said second part being of a thickness and material which is incapable of supporting said pair of brake shoes and exhibiting low vibrational resonance.

It is an advantage of the present invention that the second part is utilized for sealing enclosure purposes so that is can be designed of lightweight material without concern for torque taking or supporting characteristics.

In addition, it is possible to utilize the first part with different second parts to accommodate drum brake assemblies with varying diameter and/or varying brake shoe widths. Since the second part is preferably made from plastic which is easily molded in a cost effective process, it is possible to provide one first part for many sizes of drum brake assemblies.

It has been further determined that if the second part is manufactured from a plastic material which exhibits low vibrational resonance, that is, a material which exhibits a high self-damping vibrational characteristic, and securing the second part tightly to the periphery of the first part, the second part will effect substantial reduction in noise and vibration of the brake assembly.

The invention will now be described with reference to the accompanying drawings wherein one embodiment of the invention is disclosed:

FIG. 2 is a cross sectional view taken along line 2—2 of FIG. 1;

FIG. 3 is a view similar to FIG. 2 shown with a larger size brake assembly.

FIG. 4 is a fragmentary perspective view showing details of the locking tabs.

Figure 1:
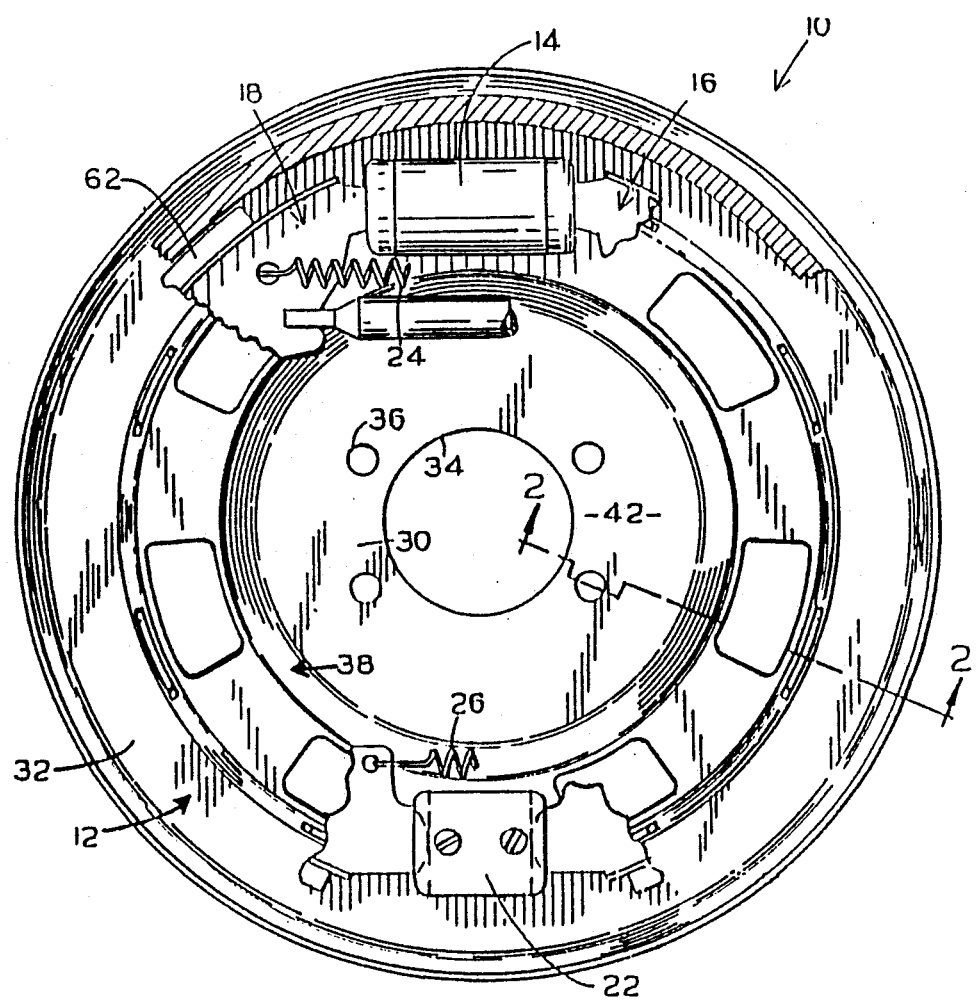
FIG. 1 is a plan view of a brake assembly utilizing the backing plate of the present invention.

A drum brake assembly 10 includes a backing plate assembly 12 supporting a wheel cylinder or hydraulic actuator 14 and a pair of brake shoes 16 and 18. The wheel cylinder 14 receives fluid pressure during a brake application to expand the pair of brake shoes 16 and 18 into engagement with a drum 20 to be braked. Braking torque developed during braking is transmitted from the brake shoes to an anchor 22 formed by the backing plate assembly 12. Springs 24 and 26 retain the pair of brake shoes in engagement with the wheel cylinder 14 and the anchor 22, respectively.

In accordance with the invention, the backing plate assembly 12 comprises a first part 30 and a second part 32. The first part 30 includes a central opening 34 with a plurality of openings 36 adjacent thereto for attaching the first part via bolts 35 to a vehicle frame. The first part forms a channel or reinforcing rib 38 extending circumferentially around the entire outer edge of the first part except for that portion of the first part receiving the wheel cylinder. The anchor 22 is formed on the reinforcing rib 38. Turning to FIG. 2, the reinforcing rib 38 forms an inner wall 40 extending axially outwardly and adjacent a flat portion 42, a support wall 44 offset axially outward the flat portion 42 and contiguous the inner wall 40, and an outer wall 46 extending axially inward from and contiguous with the support wall 44. The outer wall 46 forms a plurality of cut outs 50 and the second part 32 is provided with flexible tabs 52 for disposition in the cut outs 50 when the second part 32 is releasably coupled to the first part 30.

The support wall 44 engages the brake shoe 16 via a brake shoe web 54 to define a guide directing the movement of the brake shoe 16 as it slides on the support wall 44 during braking. The channel 38 forms a cavity 56 opening inwardly and the second part 32 forms a cavity 58 opening outwardly. The brake shoe web 54 and lining 62 extend into the cavity 58 and the drum 20 also extends into the cavity 58 such that the second part 32 is disposed closely adjacent the drum 20 to form a seal-like disposition to keep contaminants outside the drum and backing plate assembly.

Because the reinforcing rib 38 is circumferentially in line with the anchor 22, braking torque is directly applied to the reinforcing rib 38 and then spread over the flat portion 42 and the attachment means at openings 36. The second part 32 takes no braking torque.

In order to assemble the parts 30 and 32, the parts are positioned such that the radially inner lip 60 of the part 32 is aligned with the outer wall 46. The lip 60 is advanced into the cavity 56 so that the flexible tab 52 is permitted to extend into the cut out 50 in order to releasably couple the parts 30 and 32 together. The part 32 is easily separated from the part 30 when the tab 52 is withdrawn from the cut out. It is possible to inspect for brake shoe lining wear without removal of the drum 20 when the part 32 is separated from the part 30. The brake shoes, wheel cylinder and part 30 can remain secured to the vehicle frame when the part 32 is separated from the part 30 for lining wear inspection.

In FIG. 3, a brake shoe 116 is shown with the first part 30. The brake shoe 116 is slightly larger in diameter than the brake shoe 16 and the width of rim 115 is larger than the width of a rim 15 for brake shoe 16. The brake shoe 116 is used with a larger drum 120. A new second part 132 is releasably coupled to the first part 30 in the same manner as the second part 32. However, the dimension of the new second part 132 is larger than part 32 in order to accommodate the larger drum 120.

Figure 5:
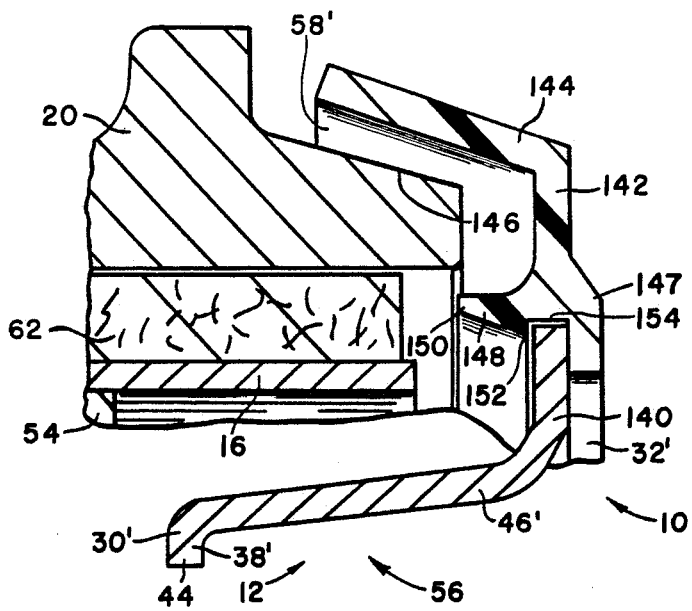
FIG. 5 is a fragmentary cross-sectional view of a brake assembly having modified securement means particularly suitable for reduction of noise in the brake assembly.
Figure 6:
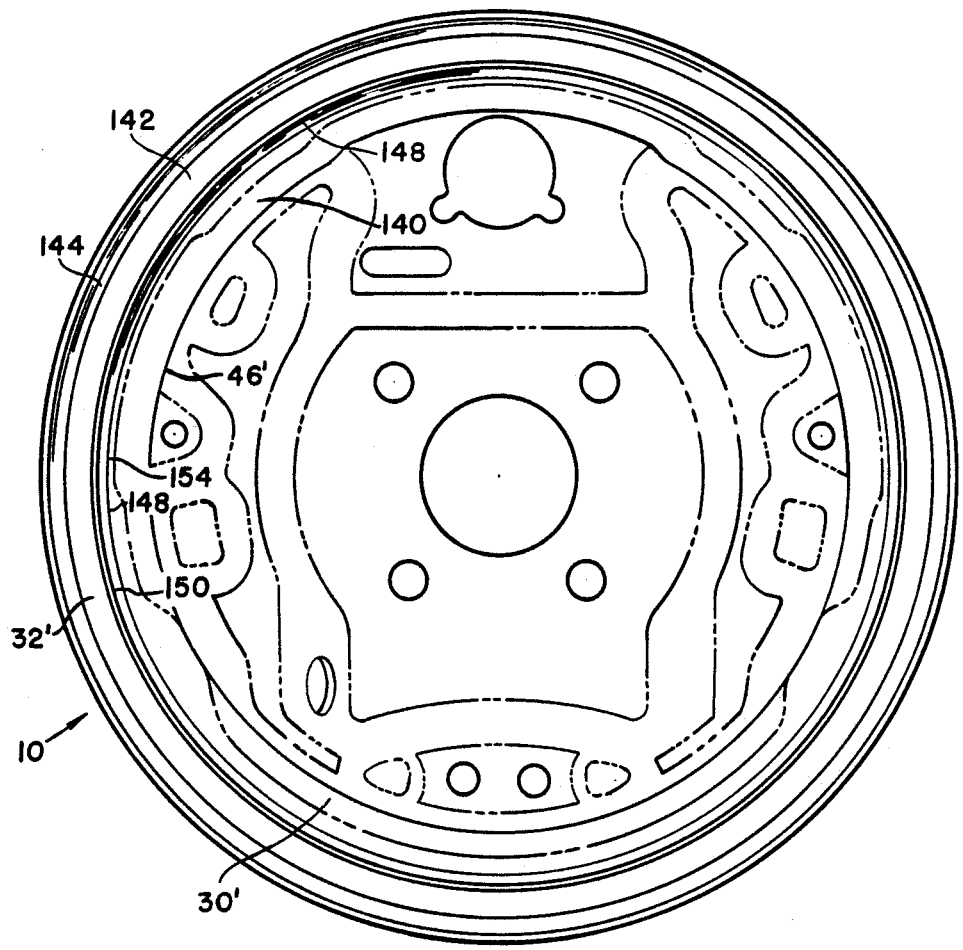
FIG. 6 is a plan view of the embodiment of FIG. 5.

Referring now specifically to FIGS. 5 and 6, there is shown an alternative embodiment of assembly 10 which, like the embodiment shown in FIGS. 1 through 4, effects closure of the brake assembly to protect against contamination and permits the use of a single reduced size first part with variably dimensioned second parts to provide cost saving and weight reduction. It has, additionally, been determined that by providing a tight frictional fit between the first and second parts, and manufacturing the second part of a material which exhibits a high vibration damping characteristic, significant reduction in brake noise can be effected. A particularly advantageous configuration for this purpose is shown in FIGS. 4 and 5. As in the previous embodiment, the first part 30' is formed to define a reinforcing rib 38' extending circumferentially around the entire outer edge of the first part, the outer periphery of first part 30' being formed to define an outer wall portion 46' extending axially inward. The first part 30' is further provided with a radially extending flange portion 140 at its axially inner end.

In this embodiment, second part 32' includes a radially extending wall portion 142 disposed in radial alignment with the flange 140 and bounded by an axially outwardly extending shield portion 144 disposed in radially spaced-apart relationship to the outer periphery 146 of the drum 20. The radially inwardly disposed portion of the wall 142 is stepped axially inwardly at 146 and abuttingly engages a flange 140. A circumferential rib 148 extends outwardly from the wall portion 142. Rib 148 is tapered such that its outer end 150 has a radius greater than that of the flange 140 while its axially inner end 152 has a radius less than that of the flange 140.

Rib 148 defines a circumferential slot 154. This allows the second part 32' to be pressed outwardly relative to first part 30' to engage flange 140 with the recess 154. The dimensions of the slot 154 are such that it tightly, frictionally engages the flange 140. Preferably, the slot 154 has a diameter equal to or less than the outside diameter of flange 140 such that second part 32' is under tension when mounted. By reason of this structure, any vibrations occurring in the first part 38' are transmitted via the frictional coupling to the second part 32'. By fabricating the second part 32' from a material which exhibits a significant vibration damping characteristic, it has been found that the second part, in addition to the advantages above stated, also functions to substantially dampen or otherwise reduce noise and vibration occurring in the brake assembly 12. This is effected by reason of the vibrations occurring in the rigid first part being transmitted via friction to the second part 32'. It is believed that the significant vibration and noise reduction is effected in part by providing a second part 32' of a material having a significantly different specific gravity and rigidity than the first part 30' whereby the first and second parts exhibit significantly different resonant frequencies and interact to damp vibrations in the other part and further by reason of the inherent characteristic of certain materials to dampen or absorb vibrations. For example high density plastics such as Farathane urethane elastomer, F111-662-S manufactured by Farathane, Inc. have proven effective. Other materials such as fiber filled nylon have also proven successful. Such materials will typically have a shore hardness between 50 and 100 and a specific gravity between 1.00 and 1.20. These values should, however, be considered as exemplary but not exclusive, it being important only that the second part have a significantly different specific gravity than the first part and exhibit the significant vibration damping characteristics exhibited by many plastics as well as some other materials.

This same noise reduction effect can be accomplished with the first described embodiment by dimensioning the lip 60 such that it also tightly frictionally engages the inner surface of outer wall 46, again, to insure transmission of vibration between the first and second parts.

Figure 7:
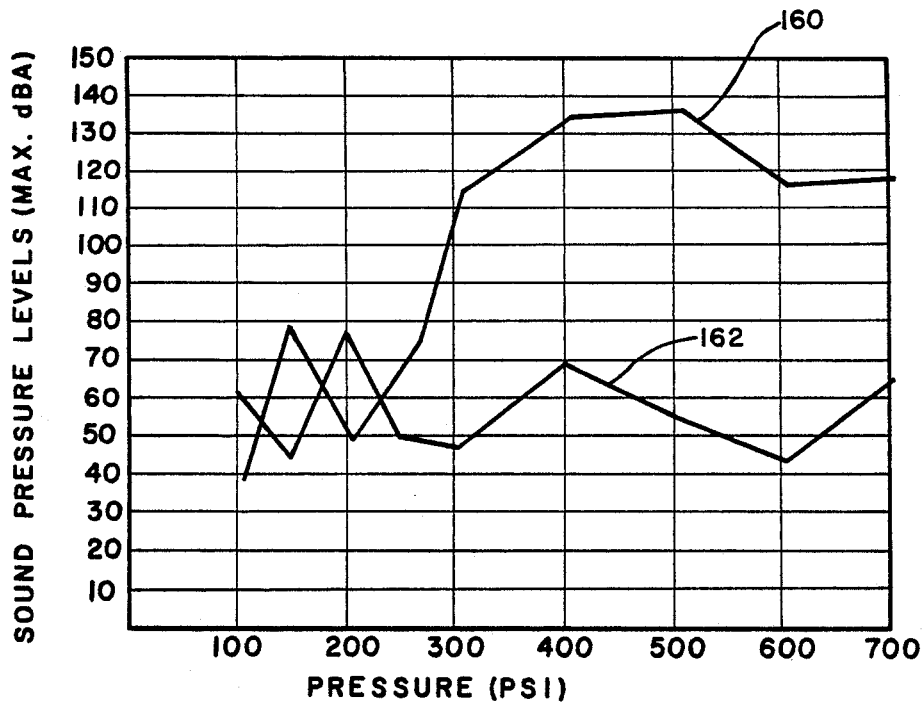
FIG. 7 is a chart showing the noise reducing effect of the invention.

Referring now to FIG. 7, there is shown in graph form a sample of typical sound pressure levels exhibited by a conventional brake assembly and sound pressure levels of a similar brake assembly incorporating first and second parts in accordance with the present invention. Tests have indicated that sound pressure levels can be reduced by as much as two thirds. The particular test data shown is typical of results wherein brake speed, pressure, and temperature were varied and should be considered only exemplary of the noise reducing characteristics of a brake assembly in accordance with the present invention. Line 160 is data for a conventional assembly and line 162 is data for an assembly in accordance with the present invention.

Lastly, it will be observed that the second part 32' can, as with the second part 32, be mounted to a brake assembly while it is mounted on a vehicle by insertion from the axially outer end of the assembly with the brake drum removed and that the second part can be easily removed for inspection of the brake linings without removal or other disassembly of the brake.

In view of the foregoing, it is seen that the backing plate assembly part 30 can be used for different sizes of brake drums so that only the part 32 need be changed to accommodate the different sizes of brake shoes and drums. Since the second part 32 is free of torque, it can be made of lightweight inexpensive material such as plastic. Therefore, an increase in the size of the drum or the lining width will require a slight increase in cost for the backing plate assembly only with respect to the larger size part 132, as the first part 30 remains the same. The tight friction coupling and proper selection of materials for the second part further provides substantial reduction in brake noise.

Various modifications of the above-described embodiment of the invention will be apparent to those skilled in the art. It is to be understood that such modifications can be made without departing from the scope of the invention.

We claim:

1. A backing plate assembly for a drum brake having a pair of brake shoes, the backing plate assembly comprising a first part adapted for attachment to a vehicle frame and a second part connected with the first part and cooperating with the first part and a drum of the drum brake to substantially close an open area disposed between the drum and first part, characterized in that said first part comprises a substantially flat portion for attachment to the vehicle frame and a reinforced portion having an inner wall contiguous with the flat portion and extending axially outwardly therefrom and substantially circumferentially around the first part, a support wall offset axially from said flat portion and engageable with webs of the pair of brake shoes, and an outer wall having a body extending axially inwardly from the support wall and substantially circumferentially around said first part, said second part coupled to said first part at the outer wall, the second part comprising a single piece, integral self-supporting member that is tightly and frictionally coupled to said first part by means of a snap-on connection between said first and second parts, the second part extending radially outwardly from a radial extremity of said first part and spaced axially apart from the drum, the second part having a free end extending axially over an outer axial portion of said drum, the pair of brake shoes defining an interface with an axially extending surface of said drum, and the first and second parts coupled together at a location on the outer wall, the location being disposed solely, radially inwardly of the interface.

2. The assembly in accordance with claim 1, wherein the second part is substantially U-shaped.

3. The assembly in accordance with claim 2, wherein said body defines a plurality of cut-outs and said second part defines a plurality of tabs, said tabs being releasably engageable with said cut-outs via the snap-on connection, said tabs maintaining said second part in the tight and frictional coupling with said first part.

4. The assembly in accordance with claim 3, wherein said tabs extend radially outwardly and each tab has a sloped outer surface that enables the second part to be snapped onto the first part.

5. The assembly in accordance with claim 1, wherein the first and second parts each comprise a material of substantially different specific gravity.

6. The assembly in accordance with claim 5, wherein said first part is a generally annular formed steel member and said second part is a molded urethane elastomer.

7. The assembly in accordance with claim 1, wherein said outer wall further includes a radially outwardly extending peripheral flange contiguous with the outer wall and containing said location, and said second part being annular and including a radially inwardly disposed recess receiving said flange.

8. The assembly in accordance with claim 7, wherein the diameter of said recess is one of equal to and less than the diameter of said flange so that the second part may be snapped on the periphery of said flange when said second part is connected to said first part.

9. The assembly in accordance with claim 8, wherein said second part includes an annular wall portion extending between the pheriphery of said flange and the pheriphery of said drum brake, an outer wall portion comprising the free end which extends outwardly at an angle from said annular wall portion and overlies said drum, an axially outwardly extending annular rib having a tapered axially inner surface, the diameter of said tapered axially inner surface at one end being greater than the diameter of said flange at a flange distal end and at the other end less than the diameter of said flange at a flange proximal end, said rib and said annular wall portion defining said recess therebetween.

10. The assembly in accordance with claim 9, wherein the annular rib is disposed axially between the distal end of said flange and the open area between the drum and first part.

* * * * *